United States Patent [19]

Seimiya et al.

[11] Patent Number: 4,609,450
[45] Date of Patent: Sep. 2, 1986

[54] COMBINED ELECTROLYTIC-ABRASIVE POLISHING APPARATUS

[75] Inventors: Kouichi Seimiya, Sakura; Kenji Nakagami, Ayase, both of Japan

[73] Assignees: Agency of Industrial Science and Technology, Tokyo; Nakagami Kogyo Kabushiki Kaisha, Ayase, both of Japan

[21] Appl. No.: 716,239

[22] Filed: Mar. 26, 1985

[51] Int. Cl.⁴ .................. C25F 3/14; C25D 17/12
[52] U.S. Cl. .................. 204/217; 204/224 M; 204/225; 204/271
[58] Field of Search ............. 204/217, 224 R, 224 M, 204/271, 225, 129.46

[56] References Cited

U.S. PATENT DOCUMENTS

| | | | |
|---|---|---|---|
| 2,385,198 | 9/1945 | Engle | 204/129.46 |
| 3,345,281 | 10/1967 | Falls | 204/224 M |
| 3,619,401 | 11/1971 | Eisner | 204/217 |
| 3,706,650 | 12/1972 | Eisner | 204/217 |
| 3,779,887 | 12/1973 | Gildone | 204/224 R |
| 4,140,598 | 2/1979 | Kimoto et al. | 204/224 M X |

Primary Examiner—Donald R. Valentine
Attorney, Agent, or Firm—Oblon, Fisher, Spivak, McClelland & Maier

[57] ABSTRACT

Method and apparatus for combined electrolytic-abrasive polishing: providing a tool electrode rotatable by means of a rotational drive and having a liquid-permeable visco-elastic polishing member attached to the surface of a conductive disk-like tool base; contacting the visco-elastic polishing member with a free curved surface of a workpiece, with the rotational axis of the tool electrode in tilted state relative to a plane averaging undulations on the free curved surface, to contact only peripheral portions of the visco-elastic polishing member retaining abrasive grains with the workpiece; supplying an electrolyte to polishing portions between the visco-elastic polishing member and workpiece; and conducting current for electrolysis across the visco-elastic polishing member and workpiece. The apparatus can perform the combined electrolytic-abrasive polishing automatically along free curved surface of a work by the use of an automatic two-dimensional feed mechanism.

8 Claims, 8 Drawing Figures

COMBINED ELECTROLYTIC-ABRASIVE POLISHING APPARATUS

BACKGROUND OF THE INVENTION

1. Field of the Invention

This invention relates to method and apparatus for combined electrolytic-abrasive polishing suitable for mirror finishing free curved surfaces of metallic materials.

2. Description of the Prior Art

The combined electrolytic-abrasive polishing, a technology of mirror finishing surfaces of workpiece in which a passive oxidation film formed on a work surface as a result of electrolysis is removed by abrasive grains, has heretofore been applied to flat surfaces and cylindrical or other rotational surfaces, but not to arbitrary free curved surfaces. Accordingly, the conventional polishers of this sort are not applicable to polishing of free curved surfaces.

Therefore, there have been strong demands in various technical fields for the development of techniques which facilitate mirror finishing of arbitrary free curved surfaces on molds or other metallic members with complicate surface profiles or on beads of welded stainless steel plates.

For mirror finishing of such free curved surfaces, it has been the conventional practice to resort to buffing or manual operations using a suitable abrasive tool, which not only requires meticulous skill but also involves a problem that the working environment is damaged to a considerable degree.

Further, it is extremely advantageous to perform the mirror finishing of a free curved surface automatically, following the undulations of the free curved surface. In order to achieve this by the techniques generally known in the art, it is necessary to move a tool along the profile of a free curved surface on the basis of dimensional data of the curved surface profile, which are measured beforehand or simultaneously with the polishing operation by the use of very complicated and costly automation equipment. Besides, automation of the buffing operation itself is extremely difficult.

SUMMARY OF THE INVENTION

It is an object of the present invention to provide an apparatus for combined electrolytic-abrasive polishing, which makes it possible to apply to free curved surfaces of metallic workpieces the technology of combined electrolytic-abrasive polishing, in which a surface of a work is mirror-finished by removing a passive oxidation film, formed on the work surface as a result of electrolysis, by means of abrasive grains.

It is another object of the invention to provide an apparatus for combined electrolytic-abrasive polishing of free curved surfaces in a simple fashion, employing as a polishing means a tool electrode which is fitted with a visco-elastic polishing member on the surface of a disk-like tool base and adapted to contact a work with its spindle in tilted state relative to a plane averaging undulations on the free curved surface of the work, thereby contacting only peripheral portions of the visco-elastic polishing member of the tool electrode with the work surface.

It is a further object to provide an apparatus for combined electrolytic-abrasive polishing, employing means for contacting a visco-elastic polishing member on a tool electrode with a workpiece only in peripheral portions of the polishing member, thereby stably contacting fine portions of the visco-elastic polishing member stably during the operation and maintaining substantially the same relative sliding speeds over the entire contacting surfaces to ensure uniform polishing, while feeding an electrolyte to the polishing area by means of centrifugal force.

It is still another object of the invention to provide an apparatus for combined electrolytic-abrasive polishing, in which a tool electrode for the combinined electrolytic-abrasive polishing is arranged to have an excellent electrolyte retaining capacity to permit mirror finishing of not only basically horizontal free curved surfaces but also almost vertical curved surfaces.

It is still another object of the invention to provide an apparatus, in which the combined electrolytic-abrasive polishing of a free curved surface can be performed automatically along the free curved work surface.

It is a further object of the invention to provide an apparatus capable of combined electrolytic-abrasive polishing automatically along a free curved surface of a work by the use of an inexpensive automatic two-dimensional feed mechanism of simple construction.

In order to achieve the above-mentioned objectives, the method for using the combined electrolytic-abrasive polishing apparatus according to the present invention comprises: providing a tool electrode rotatable by means of a rotational drive and having a liquid-permeable visco-elastic polishing member attached to the surface of a conductive disk-like tool base; contacting the visco-elastic polishing member with a free curved surface of a workpiece, with the rotational axis of the tool electrode in a tilted state relative to a plane averaging undulations on the free curved surface, to contact only peripheral portions of the visco-elastic polishing member with the workpiece through abrasive grains; supplying an electrolyte to the polishing area between the visco-elastic polishing member and work-piece; and conducting current for electrolysis across the visco-elastic polishing member and workpiece.

According to the present invention, there is provided an apparatus which comprises: a tool electrode rotatable by a rotational drive and having a liquid-permeable visco-elastic polishing member attached to the surface of a conductive disk-like tool base, the visco-elastic polishing member forming in the peripheral portion thereof a machining surface containing abrasive grains and deformable in conformity with the surface profile of a work-piece; an electrolyte supply pipe for supplying an electrolyte to peripheral portions of the tool electrode; and means for connecting said tool electrode and workpiece to a power supply to conduct electrolytic current thereacross.

With the above-described method and apparatus according to the invention, it becomes possible to apply the combined electrolytic-abrasive polishing to free curved surfaces of metallic workpieces, and, by contacting only peripheral portions of a visco-elastic abrasive member on a tool electrode with a workpiece during the polishing operation, to contact fine portions of the visco-elastic abrasive member stably with the workpiece. Besides, substantially the same relative sliding speeds are maintained over the entire contacting surfaces of the visco-elastic abrasive member and a workpiece, so that it is possible to polish the contacting surfaces uniformly without a speed difference between center and peripheral portions as experienced, for example, in a case where a disk-like visco-elastic polishing member of a small diameter is entirely contacted with a machining surface.

Further, in the combined electrolytic-abrasive polishing method and apparatus according to the invention, an electrolyte pool is formed within a base of the tool electrode in such a manner that an electrolyte will flow out under influence of centrifugal force through electrolyte outlets provided slightly on the inner side of the peripheral edge of the tool base, supplying the electrolyte to contacting portions of the visco-elastic abrasive member at the outer periphery of the tool electrode and a polishing surface of a workpiece, dispensing with equipment for feeding the electrolyte under pressure and permitting polishing of not only horizontally disposed curved surfaces but also almost vertically disposed curved surfaces by the use of a tool electrode with a high electrolyte retaining capacity.

Moreover, the combined electrolytic-abrasive polishing method and apparatus according to the invention employs an arrangement suitable for automatically moving a tool electrode along a free curved surface of a workpiece, so that it becomes possible to provide an automatic polishing machine for free curved surfaces at low cost by addition of a simple two-dimensional feed mechanism.

The above and other objects, features and advantages of the invention will become apparent from the following description and appended claims, taken in conjunction with the accompanying drawings which show by way of example preferred embodiments of the invention.

DESCRIPTION OF PREFERRED EMBODIMENTS

Figure 1:
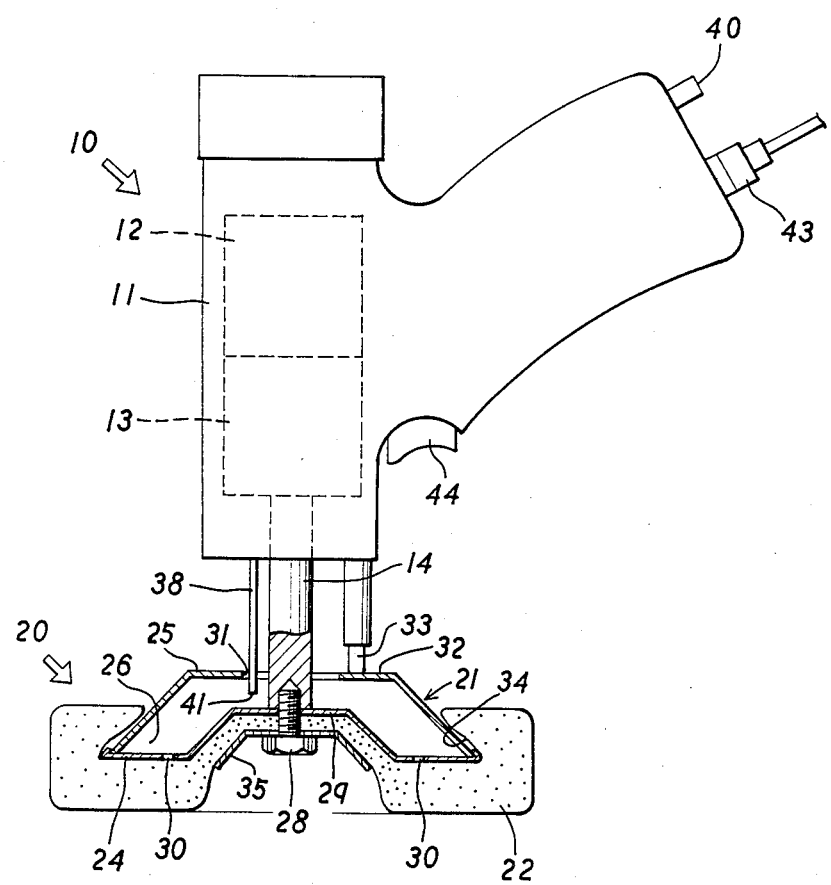
FIG. 1 is a partly sectioned schematic view of a combined electrolytic-abrasive polisher according to the invention.

Referring to FIG. 1, indicated at 10 is an electrolytic-abrasive polisher 10 embodying the present invention, including a pistol-shaped housing 11 accommodating a rotational drive 12 consisting of a motor and a reducer 13 provided on the output side of the drive to rotate a spindle 11 which is led out of the housing 11 and has a tool electrode 20 attached to the lower end thereof.

Figure 2:
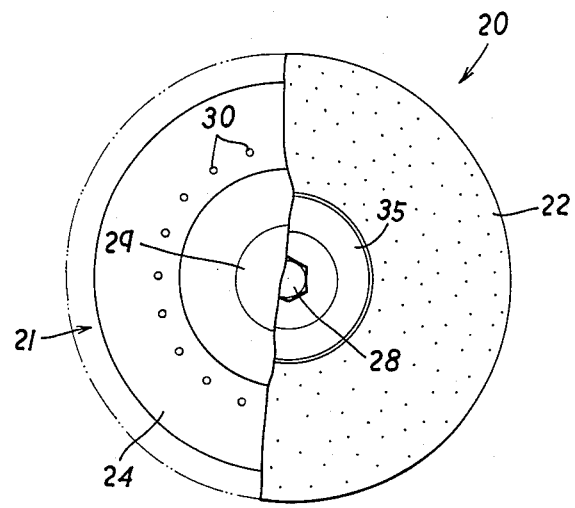
FIG. 2 is a partly cutaway front view of a tool electrode of the polisher of FIG. 1.

As shown in FIGS. 1 and 2, the tool electrode 20 is constituted by a tool base 21 of a substantially disk shape which is formed of copper or other conductive material, and a visco-elastic abrasive 22 attached to the surface of the tool base 21. The tool base 21 includes a disk-like front plate 24 to be attached to the lower end of the spindle 14, and a rear plate 25 which is joined to the front plate 21 at the peripheral edges to form an electrolyte pool 26 around and on the back side of the front plate 24. The front plate 24 is centrally provided with a recess 29 to receive therein a head portion of a screw 28 which fastens the tool base 21 to the spindle 14, and with a multitude of electrolyte outlet holes 30 at positions slightly inward of its peripheral edges. The rear plate 25 is formed with an electrolyte supply opening 31 centrally around the spindle 14, and a sliding contact surface 32 around the opening 31 for contact with a power supply shoe 33 which supplies current for electrolysis as will be described hereinlater.

The visco-elastic polishing member 22 which is attached to the surface of the tool base 21 is constituted by a liquid permeable visco-elastic material including sponge-like materials such as foamed polyurethane or other foamed synthetic resins or unwoven nylon fabric, which is in the form suitable for attachment to the surface of the conductive tool base. In the case of a sponge-like material employed in the particular embodiment shown, it is provided with a cavity 34 which fits on the tool base 21 and mounted on the spindle by fastening same to the spindle 14 along with the tool base 21 by a screw 28 through a doubling plate 35. In a case employing a visco-elastic polishing member 22 in the form of unwoven nylon fabric or the like, its peripheral portions are fixed to the surface of the tool base 21 by an adhesive or other suitable means and fastened to the spindle 14 through the doubling plate 35.

The visco-elastic polishing member 22 may hold abrasive grains dispersedly on its surface or in its entire body. In such a case, abrasive grains of alumina or the like are fixed in bonded state on unwoven nylon sheet or the like by the use of a synthetic resin bond which is mixed with the abrasive grains. Alternatively, instead of fixing abrasive grains in the just-mentioned manner, loose abrasive grains may be supported in meshes of unwoven fabric.

A multitude of electrolyte outlet holes 30 in the front plate 24 are provided in positions slightly inward of the peripheral edges of the tool base 21 for the purpose of forming an electrolyte pool 26 in inner peripheral portions of the tool base 21, storing the electrolyte temporarily therein to feed same stably through a large number of electrolyte outlet holes 30. Accordingly, while the tool electrode 20 is rotated, the electrolyte which flows out continuously through the outlet holes 30 is fed to the contacting area of the visco-elastic polishing member 22 and a work around the peripheral portions of the tool electrode 20 under the influence of centrifugal force. It follows that there is no need for providing facilities for feeding the electrolyte under pressure. In addition, since the tool electrode has a high electrolyte holding capacity, it is possible to feed the electrolyte stably not only to a horizontally curved surface but also to an almost vertical curved surface.

An electrolyte feed pipe 30 which supplies the electrolyte to polishing portions around the periphery of the tool electrode 20 has its inlet end opened at the rear end of the housing 11 and its outlet end 41 opened into the tool base 21 through the electrolyte supply opening 31 which is formed centrally in the rear plate 25 around the spindle 14. In place of or in addition to the abrasive grains carried by the visco-elasting polishing member, abrasive grains may be admixed into the electrolyte to be supplied through the electrolyte feed pipe 38.

A power supply terminal 43 is provided at the rear end of the housing 11 to supply electrolytic current to the tool electrode 20 through the power supply shoe 33 and the sliding surface 32 which is in contact with the power supply shoe 33, and connectible to a power source (not shown) to conduct current across the workpiece and tool electrode 20 serving as positive and negative electrodes, respectively.

Indicated at 44 in FIG. 1 is a switch member which is manipulatable to actuate the rotational drive 12.

Figure 3:
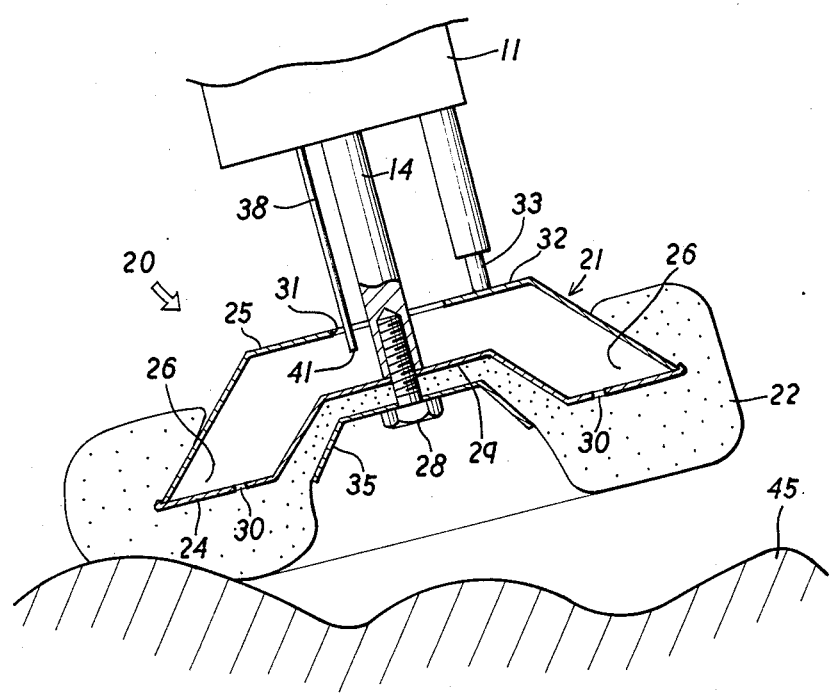
FIG. 3 is a schematic sectional view of major components of the same polisher.

The above-described electrolytic-abrasive polisher is used as a portable machine, and lightly pressed by hand against a surface of a work which need polishing. As illustrated in FIG. 3, in order to polish a free curved surface of a work 45, current of several amperes is passed between the tool electrode 20 and work 45 at a voltage of some tens of volts, while supplying thereto an aqueous solution of $NaNO_3$ or $KNO_3$ through the electrolyte supply pipe 33 and rotating the tool electrode 20 by the rotational drive 12, with peripheral portions of the visco-elastic polishing member 22 on the tool electrode 20 in pressed contact with the free curved surface of the workpiece 45.

In this instance, the spindle 14 of the tool electrode 20 is tilted relative to a plane averaging the undulations on the contacting surface of the workpiece 45 with the visco-elastic polishing member 22, thereby contacting only peripheral portions of the visco-elastic polishing member with the workpiece. Generally, it is necessary to maintain the angle of inclination of the spindle relative to the contacting surface in a range of 5°–60°, preferably in the range of 10°–45°.

In a case where the tool electrode 20 has a diameter of about 12 cm, it can give a mirror finish to a work surface containing a certain degree of undulations, since the peripheral portions of the visco-elastic polishing member are deformed into a shape fitting the surface profile of the workpiece when pressed thereagainst at a rotational speed of about several hundreds r.p.m. In this case, the pressure which is imposed by the tool electrode 20 on higher surface portions on the contacting surface of the workpiece 45 is naturally greater than the pressure on the lower surface portions, so that the amount of removal by the abrasive becomes larger on the higher surface portions. However, since relatively large raised and depressed surface portions are finished to a substantially same degree of roughness, a work can be polished efficiently in a case where accuracy in shape is not critical.

The electrolytic polishing is carried out at an extremely low current density by the use of an electrolyte such as $NaNO_3$, $KNO_3$ and the like, so that a passive oxidation film is very likely to be formed on the surface of a workpiece. However, small surface protrusions have greater possibilities of being mechanically polished by the abrasive grains, and electric activation is enhanced by removal of the passive oxidation film, thereby improving the surface roughness of the workpiece.

The electrolytic-abrasive polishing of this sort can be applied to free curved surfaces of various kinds of metallic products, and is especially suitable for polishing surfaces of stainless steels.

Figure 4:
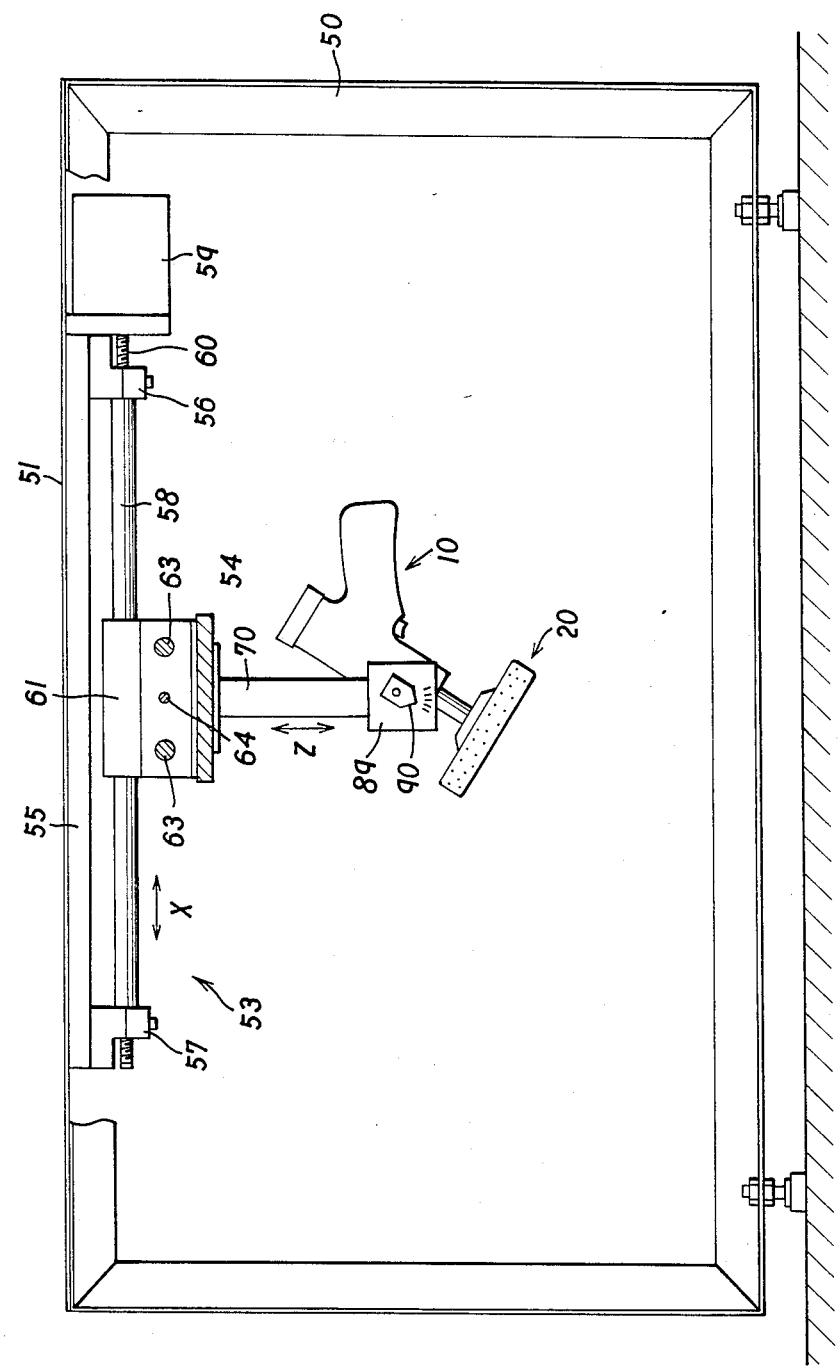
FIG. 4 is a partly cutaway front view of an automatic electrolytic-abrasive polishing apparatus according to the invention.
Figure 5:
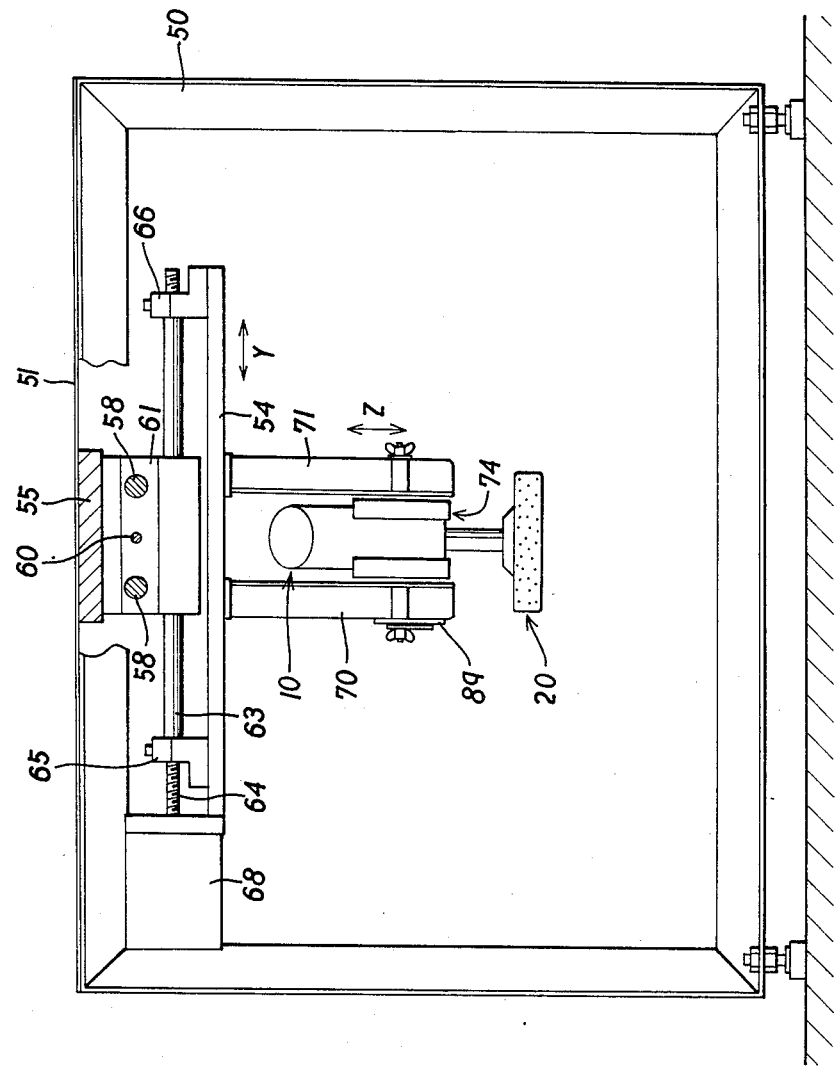
FIG. 5 is a partly cutaway side view of the apparatus of FIG. 4.

Illustrated in FIGS. 4 to 8 is an automatic polishing machine utilizing the above-described electrolytic-abrasive polisher 10. As seen in FIGS. 4 and 5, this automatic polishing machine includes a machine frame 50 formed by joining angles which are extended along the respective edges of a rectangular parallelepiped, and a two-dimensional automatic feed mechanism 53 is mounted on a support plate 51 which is in turn mounted on top of the machine frame 50.

The automatic feed mechanism 53, which moves the polisher head 10 on a carriage 54 freely in perpendicularly intersecting X and Y directions in a horizontal plane, includes paired parallel X-direction guide rods 58 between a pair of support members 56 and 57 at the opposite ends of a base plate 55 which is fixed to the support plate 51. A feed screw 60 which is rotationally driven by a motor 58 on the support plate 55 is rotatably supported also in the support members 56 and 57 and threadedly engaged with the X-direction carriage 61 in which the guide rods 58 are slidably inserted to guide the movements of the carriage 61 in X-direction. Accordingly, upon rotating the feed screw 60 by the motor 59, the X-direction carriage 61 is moved in X-direction under guidance of the guide rods 58.

Further, slidably inserted in the X-direction carriage 61 are a pair of Y-direction guide rods 63 and a feed screw 64 which are disposed perpendicular to the X-direction guide rods 58. These guide rods 63 are fixedly mounted between support members 65 and 66 at the opposite ends of the carriage 54, and the feed screw 64 is rotatably supported on the two support members 65 and 66, with one end of the feed screw 64 coupled with a motor 68 mounted on the carriage 54. Accordingly, upon rotating the motor 68, the carriage 54 is moved in Y-direction relative to the X-direction carriage 61.

The motors 59 and 68 of the above-described feed mechanism 53 are connected to a controller, not shown, which controls the operation of these two motors to move the carriage 54 along predetermined paths of movements and which may utilize one of known controllers as used in two-dimensional feed mechanisms of this sort.

Figure 6:
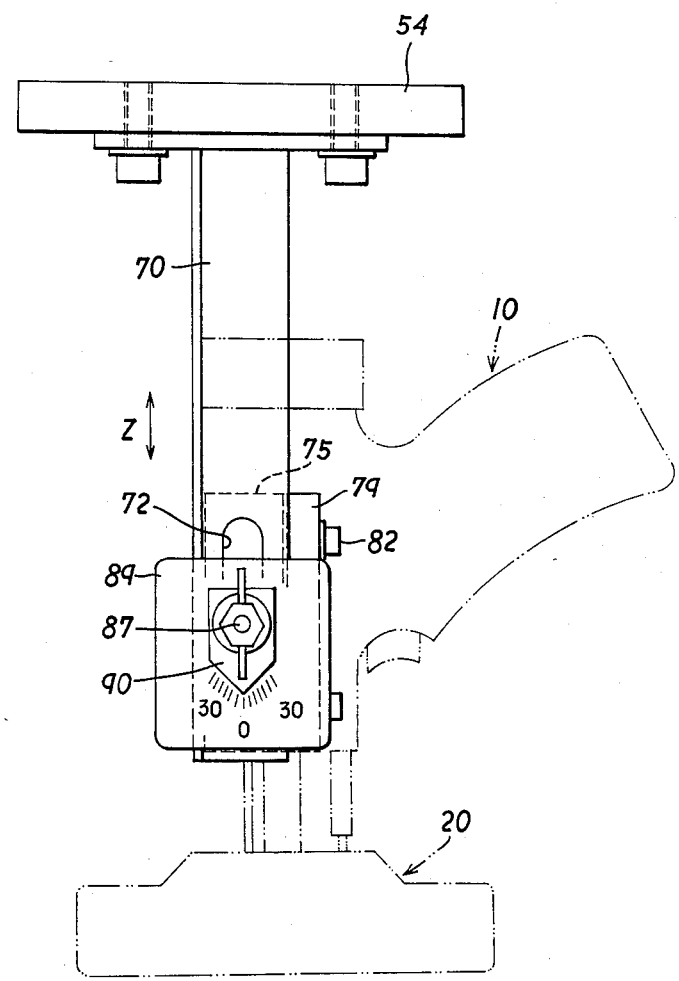
FIG. 6 is a schematic side view of an automatic two-dimensional feed mechanism mounting thereon the polisher of FIG. 1.
Figure 7:
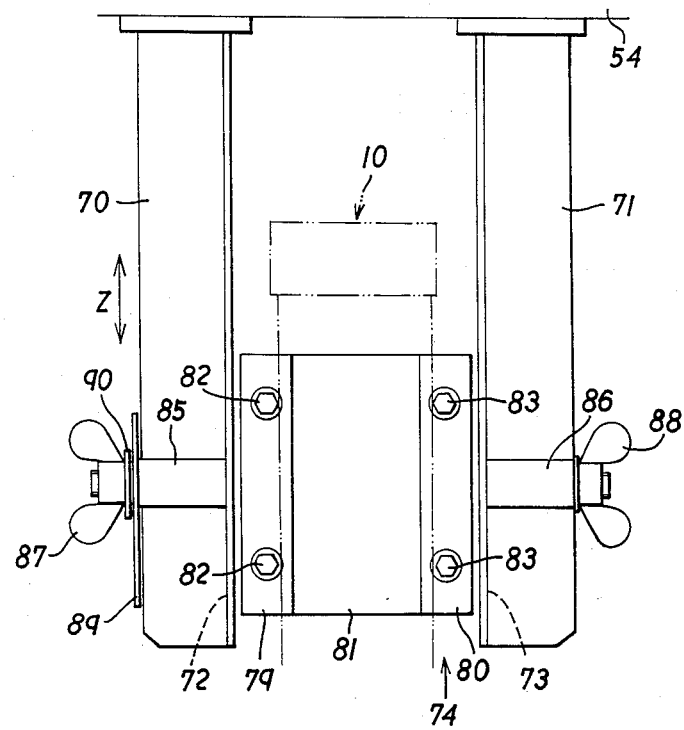
FIG. 7 is a schematic front view of major components of the automatic feed mechanism.
Figure 8:
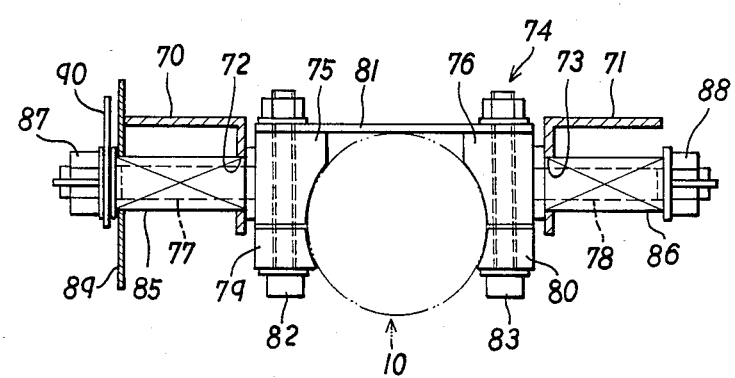
FIG. 8 is a sectional view taken on line A-A of FIG. 7.

As shown particularly in FIGS. 6 to 8, a pair of guides 70 and 71 are opposingly suspended from the carriage 54 to support the polisher head 10 slidably in a direction Z vertical to planes X and Y. These guides 70 and 71 are provided with slots 72 and 73 extending in the longitudinal direction thereof.

On the other hand, the polisher 10 is fixed in holder 74 which is arranged to hold the polisher 10 in-between a pair of split members 75 and 76 with projecting support rods 77 and 78, split support members 79 and 80 located opposingly to the split members 75 and 76, and a connecting plate 81 linking the split members 75 and 76, which are integrally fastened by bolts 82 and 83. Slide members 85 and 86 of square shape on outer side are rotatably fitted on the support rods 77 and 78 which are secured to the split members 75 and 76, and fixed in position by butterfly nuts 87 and 88. These slide members 85 and 86 are slidably received in the afore-mentioned slots 72 and 73. An angle indicator plate 89 with a dial of angle of inclination is fixed on the slide member 85, and a pointer plate 90 is fitted in the support rod 77 in such a manner as to permit its axial sliding movement while blocking its rotational movement.

Consequently, as illustrated in FIG. 4, if the butterfly nuts 87 and 88 are fastened with the polisher 10 in a suitable inclined position, the square slide members 85 and 86 are fixed in the same inclined positions and the polisher 10 can be slid freely in the direction Z in the tilted state since the slide members 85 and 86 are slidable freely within the slots 72 and 73 of the guides 70 and 71. At this time, the angle of inclination is known from the graduation on the angle indicator plate 89, on which the pointer plate 90 registers. In order to reduce the resistance of sliding movement of the slide members 85 and 86 along the slots 72 and 73, it is possible to employ various kinds of linear slide mechanisms of known arrangements.

In the automatic polishing machine of the above-described construction, a workpiece is set in the machine frame 50 and the polisher 10 is tilted suitably depending upon the surface profile of the workpiece, and, in the tilted state, peripheral portions of the visco-elastic polishing member are contacted with the work surface as explained hereinbefore in connection with FIG. 3. At the same time, the carriage 54 is moved two-dimensionally by the controller along courses which have been preset beforehand according to the surface profile of the work.

In the automatic polishing operation, it is necessary to maintain the angle of inclination of the spindle of the tool electrode within the afore-mentioned appropriate range relative to the work surface in contact with the visco-elastic polishing member. If this is not possible, the polishing operation is once stopped, and resumed after changing the angle of inclination.

While the polisher 10 is two-dimensionally moved by the automatic two-dimensional feed mechanism 53, the visco-elastic polishing member is pressed on the work surface by the weight of the polisher 10 itself. Therefore, it is necessary for the polisher 10 to have a suitable weight for this purpose. In a case where the weight of the polisher 10 itself is insufficient, a spring may be interposed between the carriage 54 and polisher 10. The provision of such a spring is also necessary to secure the required pressing force of the visco-elastic member when polishing a vertical surface of a workpiece by a polisher head 10 on the above-mentioned horizontal type automatic polishing machine.

The force with which the visco-elastic polishing member is pressed on the work surface is as small as several tens kPa, and the chipping action of abrasive grains is far weaker than that of the conventional solid grinder namely, not stronger than mere scratching action on the work surface, so that the major portion of the frictional resistance in the polishing operation is considered to take place between the visco-elastic polishing member and the work surface. Since the head pressing force is light as mentioned hereinbefore, the polisher head 10 can be automatically moved in Z-direction along the surface profile of a work simply by feeding the polisher head 10 two-dimensionally by the above-described two-dimensional feed mechanism 53.

Although the automatic polishing machine has been shown as having a hand-operating polisher head of FIGS. 1 to 3 fixedly mounted on a holder 74, it may of course be replaced by a polisher head which is constructed exclusively for the automatic polishing machine.

What is claimed is:

1. An apparatus for achieving mirror finishing by means of combined electrolytic-abrasive polishing, comprising:
   a liquid-permeable visco-elastic polishing member defining a work face holding abrasive grains and being deformable in conformance with the surface contour of the workpiece;
   a rotary drive, including a spindle, for rotating said polishing member;
   a conductive tool base having a surface to which said polishing member is attached and comprising a disk-shaped front plate attached to the tip of said spindle and a rear plate, said front and rear plates together forming an electrolyte pool on a side of said front plate opposite said polishing member, the front and rear plates being integrally joined on the periphery thereof, the rear plate having an electrolyte supply opening provided around the spindle at the center thereof, said polishing member and conductive tool base together forming a tool electrode;
   an electrolyte supply pipe having an open end inserted in said electrolyte supply opening;
   a plurality of electrolyte outlets provided in said front plate at positions radially inward from said periphery thereof, and
   means for supplying an electrolyzing current between the tool electrode and the workpiece.

2. An apparatus according to claim 1, wherein said visco-elastic polishing member comprises a member of sponge-like material detachably fitted to the conductive tool base.

3. An apparatus according to claim 2, wherein said polishing member has non-planar peripheral surface means for engaging, and conforming to the shape of, a non-planar workpiece.

4. An apparatus according to claim 1, wherein said visco-elastic polishing member comprises a piece of non-woven nylon cloth to which abrasive particles are glued using resinuous adhesive, the non-woven nylon cloth being fastened to the conductive tool base.

5. An apparatus according to claim 1, wherein said means for supplying includes a power supply shoe in sliding contact with said conductive rear plate.

6. An apparatus according to one of claims 1 to 5, including a guide mounted on a base movable in a two-dimensional plane of a two-dimensional automatic feed mechanism and extending in a direction perpendicular to the said plane, means for sliding said tool electrode along said guide and means for tilting said tool electrode at a desired angle.

7. An apparatus according t claim 6, including means for permitting said tool electrode to be pressed against the surface of the workpiece by gravity.

8. An apparatus according to claim 6, including spring means for pressing the tool electrode against the surface of the workpiece.

* * * * *